C. M. FAWCETT & W. A. MAYFIELD.
NUT LOCK.
APPLICATION FILED AUG. 23, 1909. RENEWED JAN. 19, 1911.
989,493.
Patented Apr. 11, 1911.
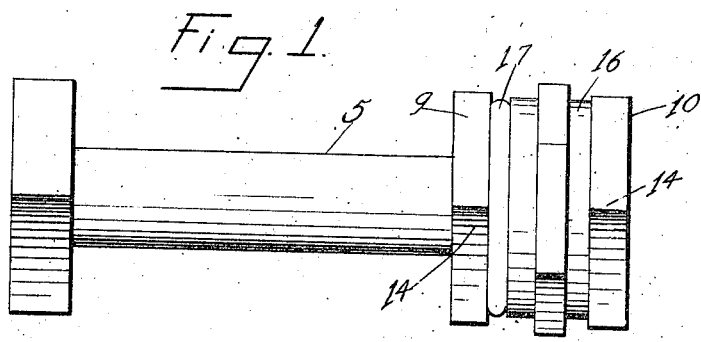
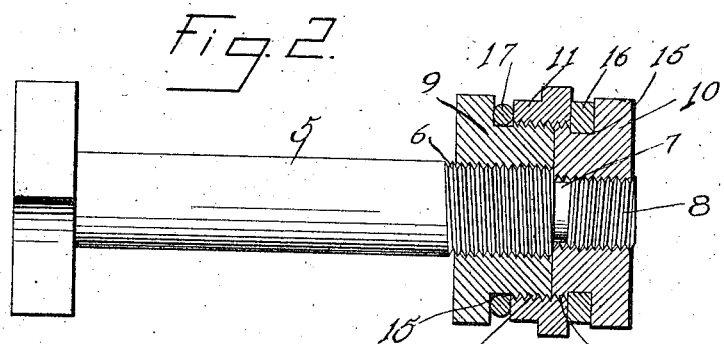
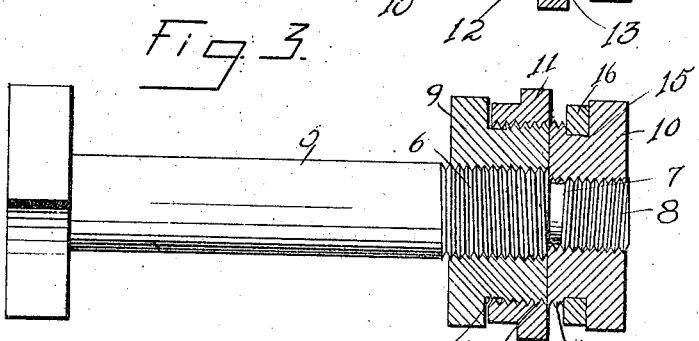
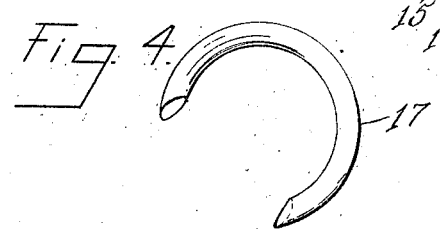
Witnesses
J. E. Strobel
F. O. Parker
Inventors
Charlie M. Fawcett
William A. Mayfield
By Chandler & Chandler
Attorneys

UNITED STATES PATENT OFFICE.

CHARLIE M. FAWCETT AND WILLIAM A. MAYFIELD, OF BOLIVAR, TENNESSEE.

NUT-LOCK.

989,493. Specification of Letters Patent. Patented Apr. 11, 1911.

Application filed August 23, 1909, Serial No. 514,249. Renewed January 19, 1911. Serial No. 603,592.

*To all whom it may concern:*

Be it known that we, CHARLIE M. FAWCETT and WILLIAM A. MAYFIELD, citizens of the United States, residing at Bolivar, in the county of Hardeman, State of Tennessee, have invented certain new and useful Improvements in Nut-Locks; and we do hereby declare the following to be a full, clear, and exact description of the invention, such as will enable others skilled in the art to which it appertains to make and use the same.

The invention relates to nut locks and more particularly to the class of nut locks employing reversely threaded bolt nuts and a locking collar.

The primary object of the invention is the provision of a nut lock which will effectually lock the nuts carried by the bolt and thereby prevent the same from becoming loose or lost from the bolt.

Another object of the invention is the provision of a nut lock in which the nuts of the bolt may be securely locked against displacement thereon and that will enable the said nuts to be removed should the same become rusty so as to bind upon said bolt thus making it difficult to remove the same.

A further object of the invention is the provision of a nut lock which is simple in construction, strong, durable, effectual in operation and comparatively inexpensive in the manufacture.

With these and other objects in view, the invention consists in the construction, combination and arrangement of parts as hereinafter more fully described, in detail, illustrated in the accompanying drawings, which disclose the preferred form of embodiment of the invention to enable those skilled in the art to practice the same and as pointed out in the claims hereunto appended.

In the drawings:—Figure 1 is a side elevation of the invention. Fig. 2 is a vertical central section of the same the bolt being shown in full lines. Fig. 3 is a similar view showing the manner of assembling the parts. Fig. 4 is a detail perspective view of one of the washers.

Similar reference characters indicate corresponding parts throughout the several views in the drawings.

In the drawings, the numeral 5 designates a bolt provided with a right hand screw threaded portion 6, and also a reduced extremity 7, with a left hand screw thread 8, for a distance of the same. An inner bolt nut 9, is provided on its inner surface with a right hand thread corresponding to and adapted to engage the threaded portion 6 of the bolt.

Engaging the reduced extremity 7 of the bolt is an outer bolt nut 10, the latter provided on its inner surface with a left hand screw thread corresponding to and adapted to engage the left hand screw thread 8, of the bolt. Carried by the inner and outer nuts 9 and 10, is a locking collar or nut 11, the latter provided on its inner surface with screw threads adapted to engage with the external screw threaded surfaces 12 and 13 of the nuts 9 and 10, when in proper position on the bolt. Each of the nuts 9 and 10, is provided with wrench engaging surfaces 14, and between this and the external thread thereof is formed an annular groove 15, the same being loosely engaged on the outer bolt nut 10, by an anti-friction washer 16, while the groove 15, in the inner nut 9 is loosely engaged by a split washer 17, the purpose of which will be hereinafter described.

The elements of the nut lock are assembled as follows: The inner nut 9, is first screwed to place on the bolt 5, the interior right hand thread of the nut engaging with the right hand thread 6 of the bolt. It being understood of course that the washer 17, has been previously detached from the inner nut. The locking collar or nut 11, is screwed onto the inner nut 9, contiguous to the wrench engaging surfaces 14, thereof. The outer nut 10, is then screwed onto the reduced extremity 7, of the bolt, its interior left hand screw engaging the left hand screw 8, of said extremity until said outer nut abuts against the inner nut. The locking collar or nut 11, is then screwed outwardly sufficiently to engage the external screw thread 13, of the outer nut, until it engages the washer 16, carried by the outer nut. Finally the washer 17, is driven onto the inner nut 9, to engage and be seated in the annular groove thereon. When thus assembled, the parts are securely held without liability of accidentally becoming loose or displaced as it will be impossible for the outer nut to turn or be turned from the bolt while it is engaged by the locking collar or nut. This locking collar nut is also held against displacement by the split washer 17, when engaged with the inner nut.

What is claimed is:—

1. The combination with a bolt having reversely threaded portions, nuts detachably engaged with said threaded portions respectively, both of said nuts being provided with abutment shoulders, a collar surrounding said nuts and in threaded engagement therewith, a permanent means surrounding one of said nuts between one end of the said collar and the adjacent shoulder of the said nut, and a detachable means surrounding the other nut between the other end of the said collar and the adjacent shoulder of the said nut.

2. The combination with a bolt having reversely threaded portions, nuts detachably engaged with said threaded portions respectively, both of said nuts being provided with abutment shoulders, a collar surrounding said nuts and in threaded engagement therewith, a washer rotatably mounted upon one nut between one end of said collar and the adjacent shoulder of the said nut, and a split resilient ring detachably surrounding the other nut between the other end of said collar and the adjacent shoulder of the said nut.

In testimony whereof, we affix our signatures, in presence of two witnesses.

CHARLIE M. FAWCETT.
WILLIAM A. MAYFIELD.

Witnesses:
W. E. MAYFIELD,
E. A. MAYFIELD.